(12) United States Patent
Kunikiyo et al.

(10) Patent No.: US 7,478,717 B2
(45) Date of Patent: Jan. 20, 2009

(54) CLUTCH CONTROL ASSEMBLY FOR VEHICLE

(75) Inventors: Katsuhiro Kunikiyo, Saitama (JP); Fuyuki Kobayashi, Saitama (JP); Kohsaku Murohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 11/360,402

(22) Filed: Feb. 24, 2006

(65) Prior Publication Data

US 2006/0191766 A1    Aug. 31, 2006

(30) Foreign Application Priority Data

Feb. 28, 2005    (JP)    ............... 2005-053936

(51) Int. Cl.
*F16D 25/08*    (2006.01)
*F16D 25/12*    (2006.01)

(52) U.S. Cl. .................. 192/83; 192/85 CA; 192/91 A; 192/96

(58) Field of Classification Search .................... 192/83; 60/566, 550, 551
See application file for complete search history.

(56) References Cited

U.S. PATENT DOCUMENTS

| | | | |
|---|---|---|---|
| 4,560,049 A | | 12/1985 | Uchibaba et al. |
| 4,650,055 A | * | 3/1987 | Ooka ........................... 192/96 |
| 5,413,200 A | * | 5/1995 | Hirata ........................... 192/83 |
| 6,148,980 A | * | 11/2000 | Patel et al. .................. 192/52.4 |
| 6,170,624 B1 | * | 1/2001 | Arai et al. ...................... 192/83 |
| 6,607,060 B2 | * | 8/2003 | Inoue ........................... 192/83 |

FOREIGN PATENT DOCUMENTS

| | | |
|---|---|---|
| DE | 103 53 174 A1 | 6/2004 |
| EP | 1 084 923 A1 | 3/2001 |
| JP | 2003-294062 A | 10/2003 |

* cited by examiner

*Primary Examiner*—Rodney H Bonck
(74) *Attorney, Agent, or Firm*—Birch, Stewart, Kolasch & Birch, LLP

(57) ABSTRACT

A clutch control assembly includes a clutch switches over a connected and disengaged state between an engine and a driven member. A first hydraulic pressure generating member is provided for generating hydraulic pressure for switching between a connected and disengaged state of the clutch according to an operation of a vehicle driver. A second hydraulic pressure generating member, independent from the first hydraulic pressure generating member, is provided for automatically generating hydraulic pressure for switching between a connected and disengaged state of the clutch according to drive conditions of the vehicle. A first piston with one side facing the first hydraulic pressure chamber linked to the first hydraulic pressure generating member and a second piston with one side facing the second hydraulic pressure chamber linked to the second hydraulic pressure generating member independent from the first hydraulic pressure generating member are interlock so as to be linked to the clutch.

20 Claims, 9 Drawing Sheets

CLUTCH CONTROL ASSEMBLY FOR VEHICLE

CROSS-REFERENCE TO RELATED APPLICATIONS

The present application claims priority under 35 USC 119 to Japanese Patent Application No. 2005-053936 filed on Feb. 28, 2005 the entire contents of which are hereby incorporated by reference.

FIELD OF THE INVENTION

The present invention relates to a clutch control assembly comprising a clutch for switching over a connected and disengaged state between an engine and a driven member, a first hydraulic pressure generating means for generating hydraulic pressure for switching between a connected and disengaged state of the clutch according to an operation of a vehicle driver, and second hydraulic pressure generating means, independent from the first hydraulic pressure generating means, for automatically generating hydraulic pressure for switching between a connected and disengaged state of the clutch according to drive conditions of the vehicle.

DESCRIPTION OF BACKGROUND ART

Japanese patent application No. 2003-294062 discloses a clutch control assembly for a vehicle capable of switching over a connected and disengaged state of a clutch for switching over a connected and disengaged state between an engine and a driven member that switches over automatically and independently of operations of the vehicle driver. With this assembly, a clutch master cylinder, for generating hydraulic pressure according to operation by a vehicle driver is connected to a sleeve cylinder driving a clutch and a clutch pressure control master cylinder for generating hydraulic pressure automatically according to the operation of an electric motor, is connected via the clutch master cylinder. The clutch master cylinder and the clutch pressure control master cylinder are connected in series to the sleeve cylinder.

However, Japanese patent application No. 2003-294062 described above, with the configuration where the clutch master cylinder and the clutch pressure control master cylinder are connected in series to the sleeve cylinder, hydraulic pressure fluctuations due to the driver's operation and hydraulic pressure fluctuations due to the clutch pressure control master cylinder are generated using the same hydraulic pressure path. It is therefore necessary to carry out electric motor control for driving the clutch pressure control master cylinder taking into consideration this kind of hydraulic pressure fluctuation interference. It has therefore been necessary to design control methods based on various clutch operation conditions for carrying out this kind of control and control has therefore become extremely complex. Further, driving of the clutch pressure control master cylinder is influenced by the clutch operation of the driver. Taking into consideration various forms of ease of use, it is necessary to include setting and control that provides compatibility with this and a substantial increase in complexity is therefore anticipated.

SUMMARY AND OBJECTS OF THE INVENTION

In order to resolve these problems, it is therefore the object of an embodiment of the present invention to provide a clutch control apparatus for a vehicle that achieves simplification of control.

In order to achieve the aforementioned object, a clutch control assembly for a vehicle includes a clutch for switching over a connected and disengaged state between an engine and a driven member, first hydraulic pressure generating means for generating hydraulic pressure for switching between a connected and disengaged state of the clutch according to an operation of a vehicle driver and second hydraulic pressure generating means, independent from the first hydraulic pressure generating means, for automatically generating hydraulic pressure for switching between a connected and disengaged state of the clutch according to drive conditions of the vehicle. A first piston with one face facing the first hydraulic pressure chamber linking with the first hydraulic pressure generating means and a second piston with one surface facing the second hydraulic pressure chamber linking with the second pressure generating means and being independent of the first hydraulic pressure chamber are linked in an interlocking manner with the clutch.

An embodiment of the present invention includes first and second pistons being housed in a housing provided with single crank drive means.

An embodiment of the present invention includes first and second pistons being housed in the housing in such a manner that one piston is concentrically surrounded by the other piston.

An embodiment of the present invention includes first and second pistons being housed to be lined up along an axial direction.

Further, an embodiment of the present invention includes the first hydraulic pressure generating means being arranged at the handlebar-side of the saddle-type vehicle, and the second hydraulic pressure generating means being arranged at the side of the vehicle frame in the vicinity of the engine body.

According to an embodiment of the present invention it is possible to switch over a state of connection and disconnection of the clutch according to the operation of the first piston according to the generation of hydraulic pressure by the first hydraulic pressure generating means. In addition, it is possible to switch over between a state of connection and disconnection of the clutch according to operation of the second piston independent to the first piston in response to generation of hydraulic pressure of the second hydraulic pressure generating means. It is therefore possible to prevent mutual interference between the clutch operation of a driver and automatic clutch control and simplification of control can be achieved. Further, it is possible to reduce the amount of operating fluid replaced by changing for just the necessary hydraulic pressure paths of the hydraulic pressure paths connected to the first and second hydraulic pressure generating means.

Further, an embodiment of the present invention includes the clutch drive means for driving the clutch that is provided in common at the first and second hydraulic pressure generating means so that the number of parts can be reduced, and so that it is easy to ensure a space for arranging the clutch drive means even in vehicles where installation space is limited.

According to an embodiment of the present invention, it is possible to prevent the clutch drive means from becoming large in an axial direction compared to where the first and second pistons are lined up in an axial direction.

According to an embodiment of the present invention, it is possible to make the external diameter of the clutch drive means small compared to where the first and second pistons are arranged concentrically and the amount of oil required for operation can be reduced.

According to an embodiment of the present invention it is possible to make the hydraulic pressure path from the second hydraulic pressure generating means to the second piston short and make the hydraulic pressure transmission time short. This makes it possible to increase the precision and responsiveness of clutch control by the second hydraulic pressure generating means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will now be described below based on the attached drawings.

Figure 1:
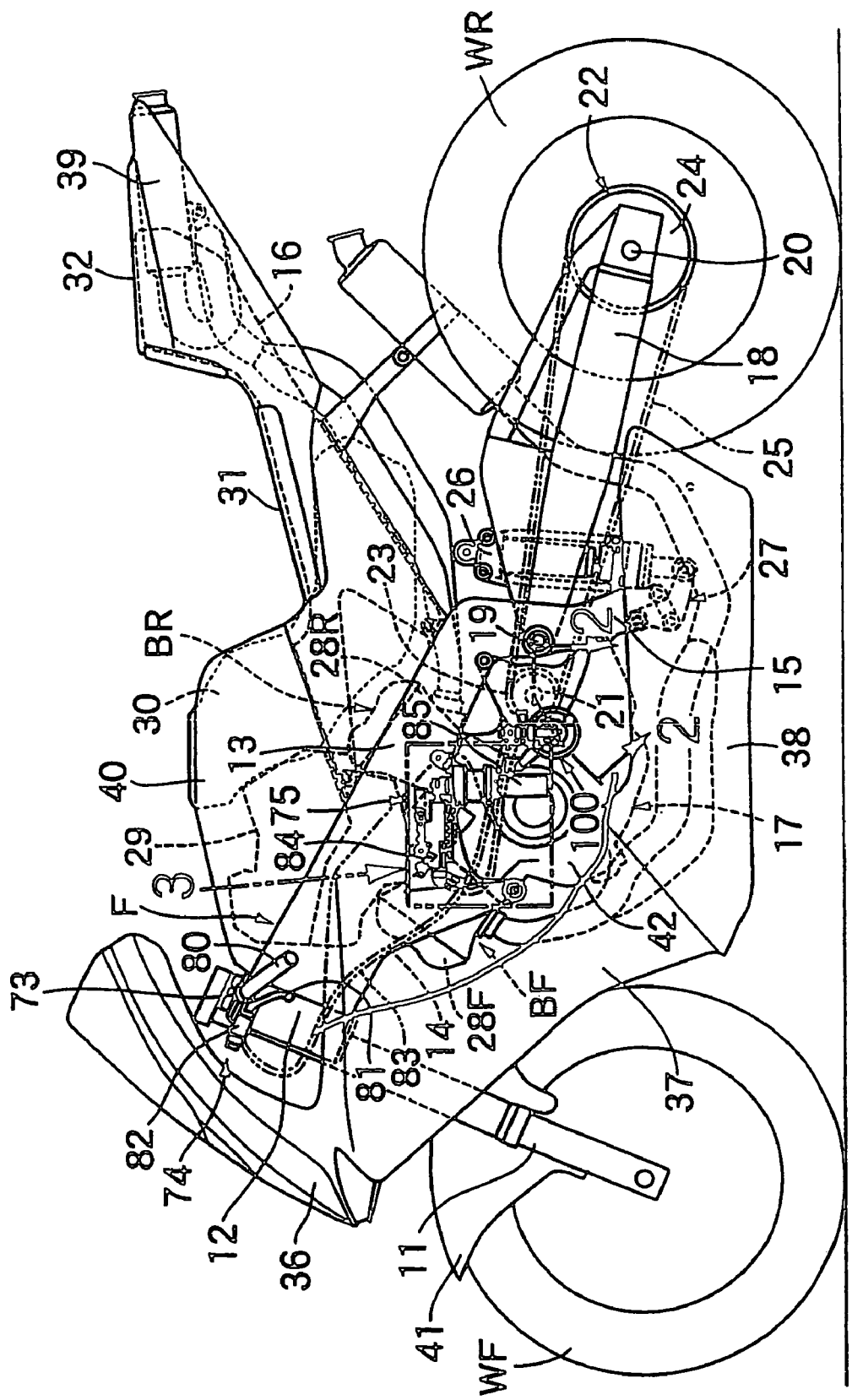
FIG. 1 is a side view of a motorcycle of a first embodiment.

As illustrated in FIG. 1, a vehicle frame F for a motorcycle which may be a saddle-type vehicle includes a head pipe 12 supporting a front fork 11 axially for supporting a front wheel WF in a steerable manner and a pair of left and right main frames 13 . . . extending downwardly to the rear from the head pipe 12 with a pair of left and right engine hangers 14 . . . welded at a front part of the head pipe 12 and main frames 13 . . . and extending downwards from the main frames 13 . . . A pair of left and right pivot plates 15 . . . extends downwardly from the rear of the main frames 13 . . . , and a rear frame 16 extends upwardly to the rear and is coupled to the rear end of the main frames 13 . . . .

A multi-cylinder, for example, a five cylinder engine body 17 constructed in a V-shape having a front bank BF and a rear bank BR, is supported at a central part of the main frames 13 . . . and an upper part and lower part of the pivot plates 15 . . . at the lower part of the engine hanger 14.

The front end of the swing arm 18 is supported in a rocking manner via a support shaft 19 at a central part in a vertical direction of the pivot frames 15 . . . and a vehicle axis 20 for a rear wheel WR is supported in a freely rotating manner at a rear part of the swing arm 18.

Transmission power from a counter shaft 21, a gear transmission 47 (refer to FIG. 2) built-into the engine body 17, is transmitted to the rear wheel WR via the chain transmission means 22. The chain transmission means 22 is constructed from a drive sprocket 23 fixed to the counter shaft 21, a driven sprocket 24 fixed to the rear wheel WR, and an endless chain 25 wrapped around these sprockets 23 and 24.

The upper end of the rear shock absorber 26 is coupled to the front part of the swing arm 18 and the lower end of the rear shock absorber 26 is coupled to the lower part of the pivot plates 15 . . . via the link mechanism 27.

An air cleaner 29 is arranged above cylinder heads 28F, 28R at the front and rear banks BR, BR of the engine body 17 and a fuel tank 30 covering the engine body 17 from above at the rear of the air cleaner 29 is supported at the rear frame 16. A main seat 31 for a rider to sit on is supported on a rear frame 16 to the rear of the fuel tank 30, and a pillion seat 32 for a rider to sit on is supported at the rear frame 16 at a position separated to the rear from the main seat 31.

The front of the head pipe 12 is covered by the front cowel 36 formed by a composite resin with both sides of the front of the vehicle being covered by a center cowel 37 made of composite resin that links with the front cowel 36, and lower cowels 38 . . . of a composite resin covering part of the engine body 17 from both sides being coupled to the center cowel 37. The rear part of the rear frame 16 is covered by the rear cowel 39, the fuel tank 30 and the air cleaner 29 are covered by a cover 40, and a front fender 41 covering the upper part of the front wheel WF is fitted to the front fork 11.

Figure 2:
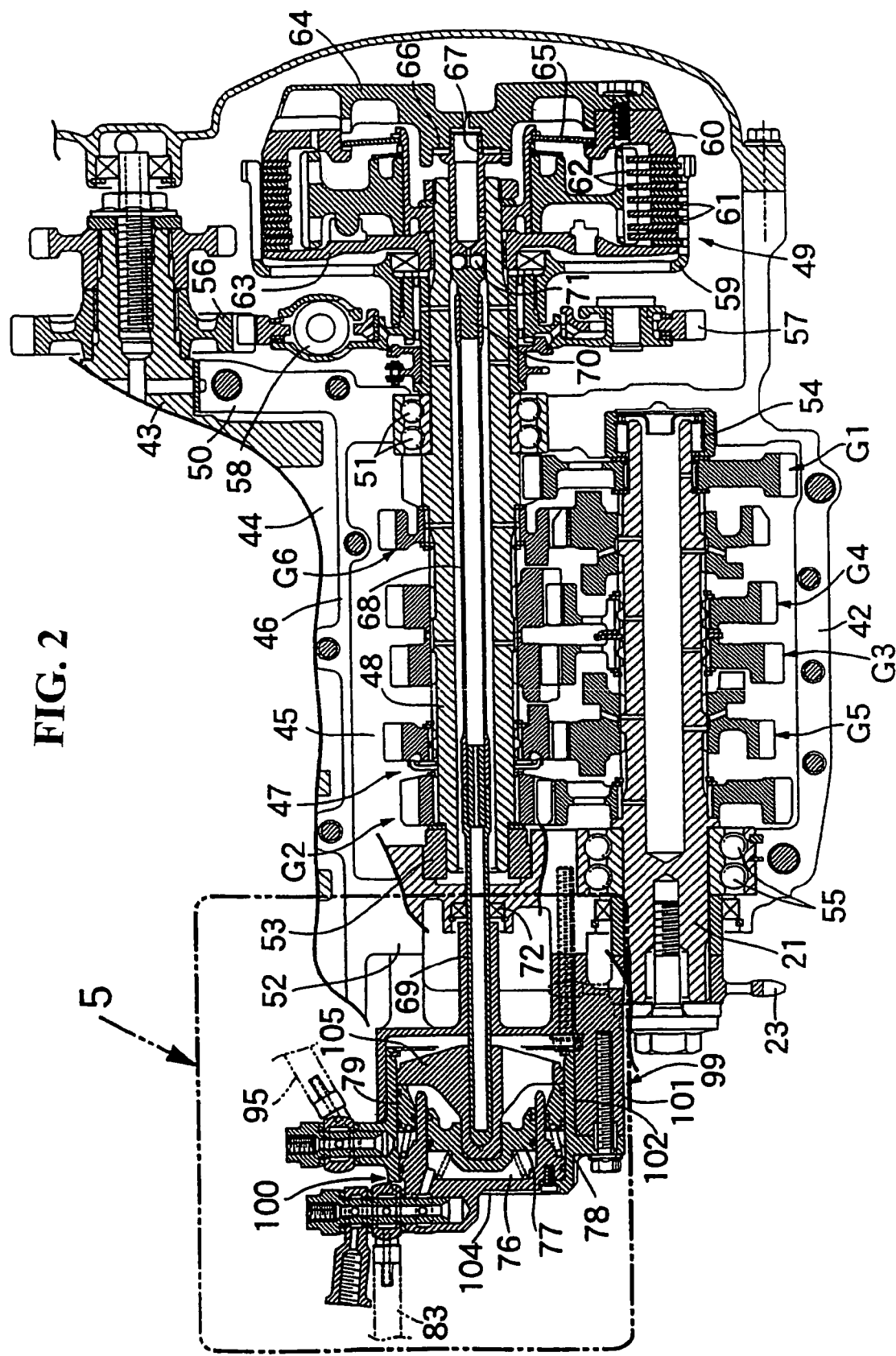
FIG. 2 is an enlarged cross-sectional view along line 2-2 of FIG. 1.

In FIG. 2, the crankcase 42 of the engine body 17 is split into two above and below, and a crankshaft 43 having an axis along a width direction of the vehicle wheels is supported in a freely rotatable manner by the crankcase 42. A crank chamber 44 housing the majority of the crankshaft 43 and a transmission chamber 45 positioned at the rear side and lower side of the crank chamber 44 are formed within the crankcase 42 in such a manner so as to enclose a bulkhead 46.

The normally meshed type gear transmission 47 is housed in the transmission chamber 45. This gear transmission 47 is provided with a plurality of gears, for example, six gears of first to sixth speed gears G1 to G6 provided between a main shaft 48 taken as a driven member having an axis parallel with the crankshaft 16 and a counter shaft 21. The countershaft 21 is arranged further to the rear side than the crankshaft 43 in such a manner so as to be supported in a freely rotatable manner by the crankcase 42, and the main shaft 48 is supported in a freely rotatable manner at a crankcase 42 at a portion corresponding to between the crankshaft 43 and the countershaft 21, with the driving force from the crankshaft 43 being inputted to the main shaft 48 via the clutch 49.

One end of the main shaft 48 passes through a right-side wall 50 constituting the right side of the direction of travel of the motorcycle at the crankcase 42 when the motorcycle carries a load, and one end of the main shaft 48 is supported at the right side wall 50 via a ball bearing 51. Further, the other end of the main shaft 48 is supported in a freely rotatable manner via bearing metal 53 at a left side wall 52 constituting the left side in the direction of travel of the motorcycle at the crankcase 42 when there is a load on the motorcycle. One end of the counter shaft 21 is supported in a freely rotating manner via a needle bearing 54 at the right side wall 50 and the other end of the counter shaft 21 is passed through the left side wall 52, with a via hole 55 being interposed between the other end side of the counter shaft 21 and the left side wall 52. A drive sprocket 23 is fixed at a projecting end of the counter shaft 21 projecting from the left side wall 52.

One end of the crankshaft 43 passes through the right side wall of the crankcase 42 so as to be freely rotating and a primary drive gear 56 is fixed to one end of this crankshaft 43. A primary driven gear 57 meshing with this primary drive gear 56 is then fitted in such a manner so as to enable relative rotation at a projection from the right side wall 50 of the main shaft 48. The primary driven gear 57 is then coupled via a damping spring 58 to a clutch outer 59 of the clutch 49 fitted at the main shaft 48 at a position further to the outside than the primary driven gear 57.

The clutch 49 includes a clutch outer 59 capable of relative rotation with respect to the main shaft 48, a clutch inner 60 that is not capable of relative rotation with respect to the main shaft 48, a plurality of drive friction plates 61 . . . engaging with the inner periphery of the clutch outer 59, a plurality of driven friction plates 62 . . . engaging with the outer periphery of the clutch inner 60 so as to be sandwiched between the drive friction plates 61 . . ., a bearing plate 63 housed within the clutch outer 59 so as to face one end of the mutually overlapping drive friction plates 61 . . . and the driven friction plates 62 . . . and fixed to the main shaft 48, a release plate 64 engaging with the clutch inner 60, and a clutch spring 65 urging the clutch inner 60 and the release plate 64 to the side of close contact with the bearing plate 63.

The clutch 49 disconnects transmission of drive force between the crankshaft 43 and the main shaft 48 by driving the release plate 64 in resistance to the spring force of the clutch spring 65 to the side of the bearing plate 63, and brings about a engaged state when force pushing the release plate 64 to the side of the bearing plate 63 is released so that the rotational force of the crankshaft 43 is transmitted to the main shaft 48.

The main shaft 48 is formed in a hollow cylindrical shape and one end of the rod 67 inserted at an end part of the main shaft 48 comes into contact via a thrust bearing 66 at a central part of the release plate 64.

A cylindrical transmission rod 68 with one end connected to the pressing rod 67 and a transmission rod 69 with one end connected coaxially to the other end of the transmission rod 68 are inserted so as to be moveable in an axial direction within the main shaft 48. A pressing member 70 fixed to one end of the transmission rod 68 is connected to the other end of the rod 67 via a plurality of spheres 71. The release plate 64 is then driven in an axial direction as a result of the transmission rods 68, 69 driving in an axial direction so as to enable the clutch 49 to be switched between a connected and disengaged state.

The other end of the transmission rod 69 projects from the other end of the main shaft 48 and passes through the left side wall 52 of the crankcase 42 so as to be freely moveable in an axial direction, with an annular seal member 72 being interposed between the transmission rod 69 and the left side wall 52.

Again, in FIG. 1, first hydraulic pressure generating means 74 is provided for generating hydraulic pressure for switching between an engaged state and a disengaged state of the clutch 49 according to the operation by a vehicle driver. A second hydraulic pressure generating means 75 is provided for automatically generating hydraulic pressure for switching over between a connected and disengaged state of the clutch 49 independently from the first hydraulic pressure generating means 74 according to vehicle drive conditions. Both are arranged in the vicinity of the engine body 17 at the main frame 13 of the vehicle frame F.

A first piston 77 is provided with one side facing the first hydraulic pressure chamber 76 linked to the first hydraulic pressure generating means 74 and a second piston 79 with one face facing the second hydraulic pressure chamber 78 linked to the second hydraulic pressure generating means 75 independent from the first hydraulic pressure generating means 76 and interlock so as to be linked at the transmission rod 69 driving the clutch 49.

The first hydraulic pressure generating means 74 includes a clutch lever 81 capable of being operated using the left hand gripping the left grip 80 of the handlebars 73 and a clutch master cylinder 82 outputting hydraulic pressure according to the operation of the clutch lever 81 with hydraulic pressure outputted from the clutch master cylinder 82 being guided by a first pipe 83.

Figure 3:
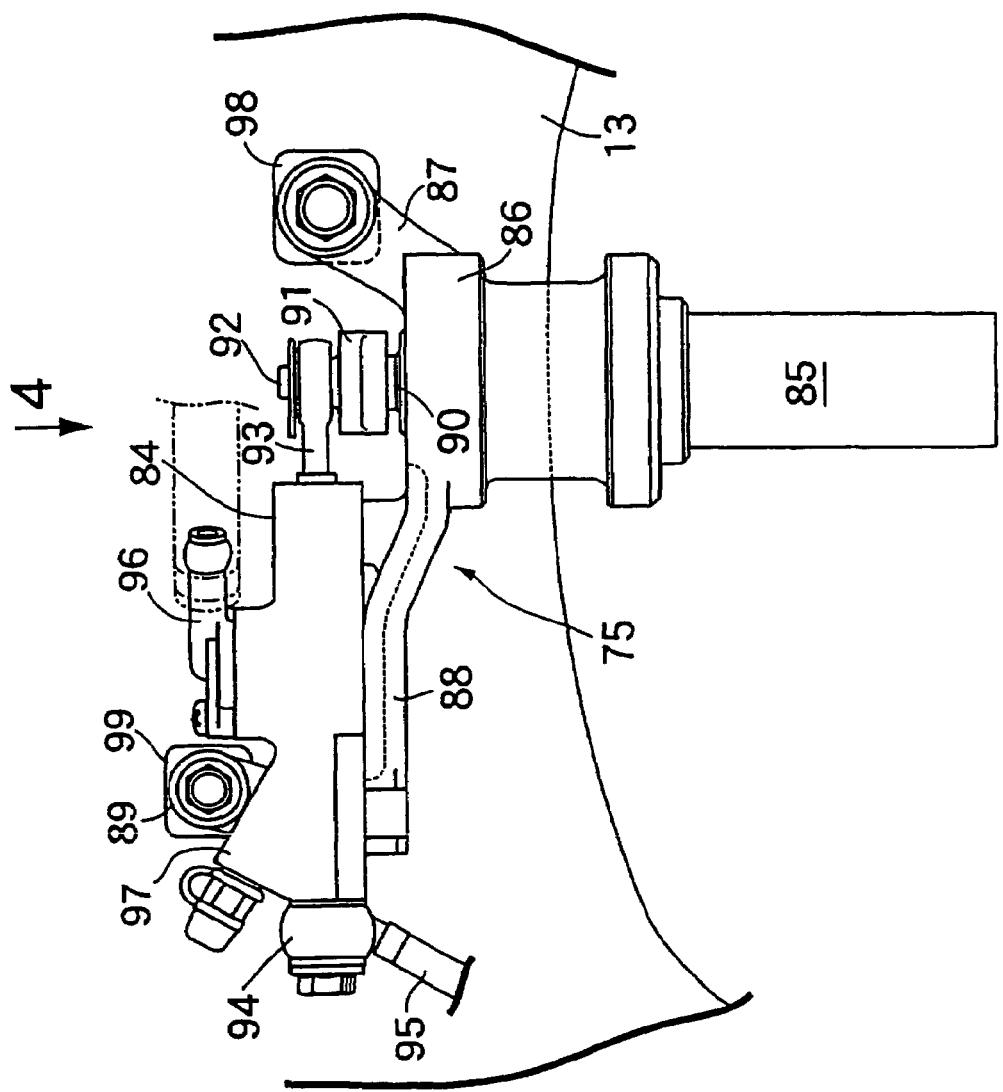
FIG. 3 is an enlarged cross-sectional view from arrow 3 of FIG. 1.
Figure 4:
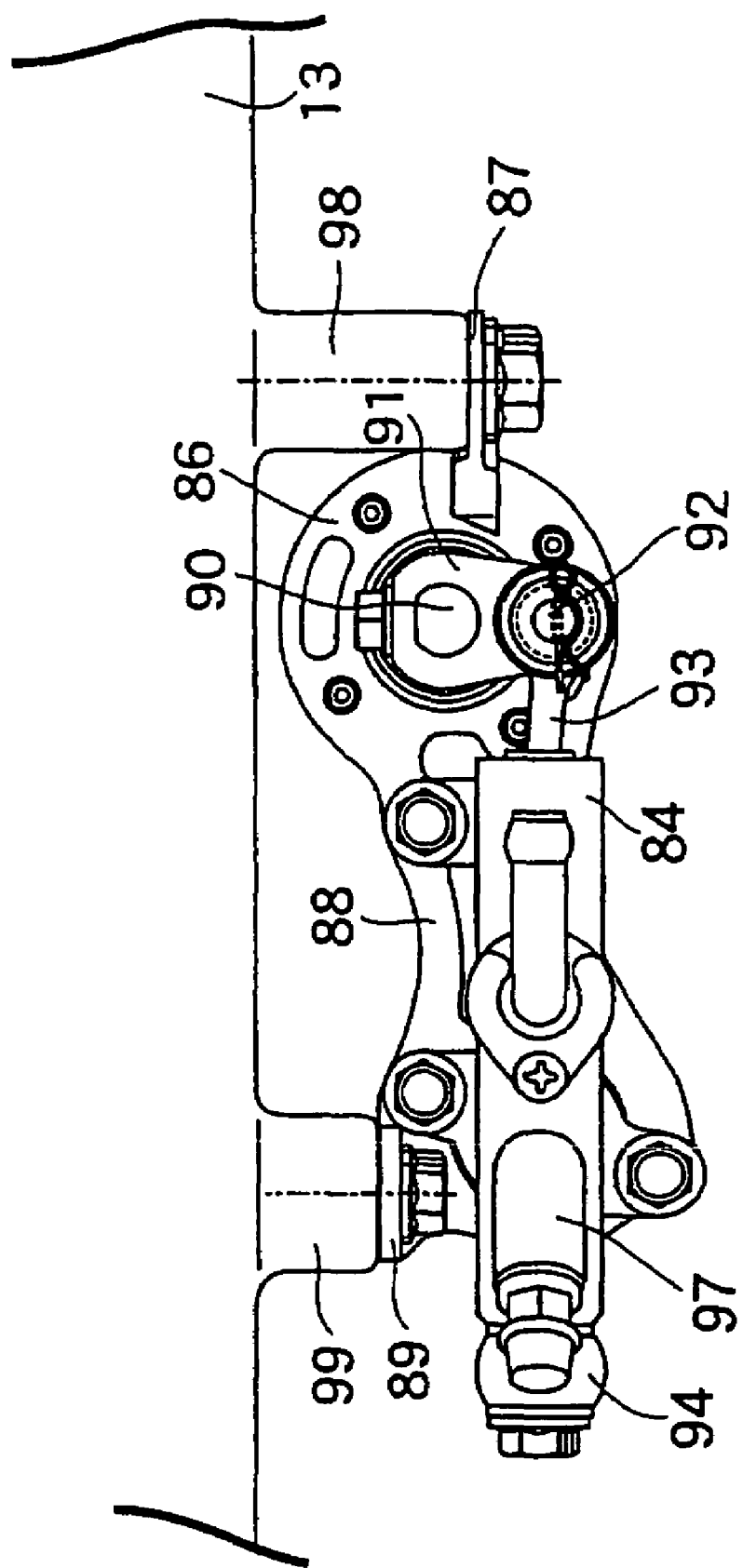
FIG. 4 is a perspective view from arrow 4 of FIG. 3.

In FIG. 3 and FIG. 4, the second hydraulic pressure generating means 75 includes a master cylinder 84 for automatic clutch control and an electric motor 85 for driving a master cylinder 84 for automatic clutch control.

The electric motor 85 includes a first fitting arm 87 fitted to the lower part of a gear box 86 built-into the reduction gear mechanism and extending upwardly from the upper part of the gear box 86. At the gear box 86, a cylinder support section 88 extends to the side from an upper part of the gear box 86 and a second fitting arm section 89 extends upwardly from the front end of the cylinder support section 88 and is provided integrally therewith. With the first and second fitting arms 87, 88 being fastened to support sections 98, 99 fixed to the main frame 13. The electric motor 85 urges this axis along a substantially perpendicular direction when fitted to the main frame 13 of the gear box 86. The master cylinder 84 for automatic clutch control use is fitted at the cylinder support section 88 of the gear box 86 so that the axis thereof is orthogonal to the axis of the electric motor 85.

An output shaft 90 reducing and outputting rotational drive force of the electric motor 85 projects upwardly and is coaxially with the electric motor 85 from the center of the upper part of the gear box 86. A base end part of a rotating arm 91 is fixed to the upper part of this output shaft 90. A linking shaft 92 parallel with the output shaft 90 projects upwardly at the end part of the rotating arm 91, and the end of a rod 93 projecting from one end of the master cylinder 84 for automatic clutch control is coupled in a rotatable manner to the linking shaft 92. By rotating the electric motor 85 backwards and forwards, the rotating arm 91 rotates about the axis of the output shaft 90, and the master cylinder 84 for automatic clutch control extends and retracts in response to this.

A second pipe 95 for guiding hydraulic pressure outputted from the master cylinder 84 for automatic clutch control is connected to the other end of the master cylinder 84 for automatic clutch control via a rotatable joint 94. Further, a reservoir connection pipe 96 connected to a reservoir (not shown) is fitted to the upper surface of the central part of the master cylinder 84 for automatic clutch control. An air extraction pipe 97 for extracting air from within the master cylinder 84 for automatic clutch control is provided integrally on the upper surface of the other end of the cylinder 84 for automatic clutch control, with this air extraction pipe 97 being closed in its normal state.

Figure 5:
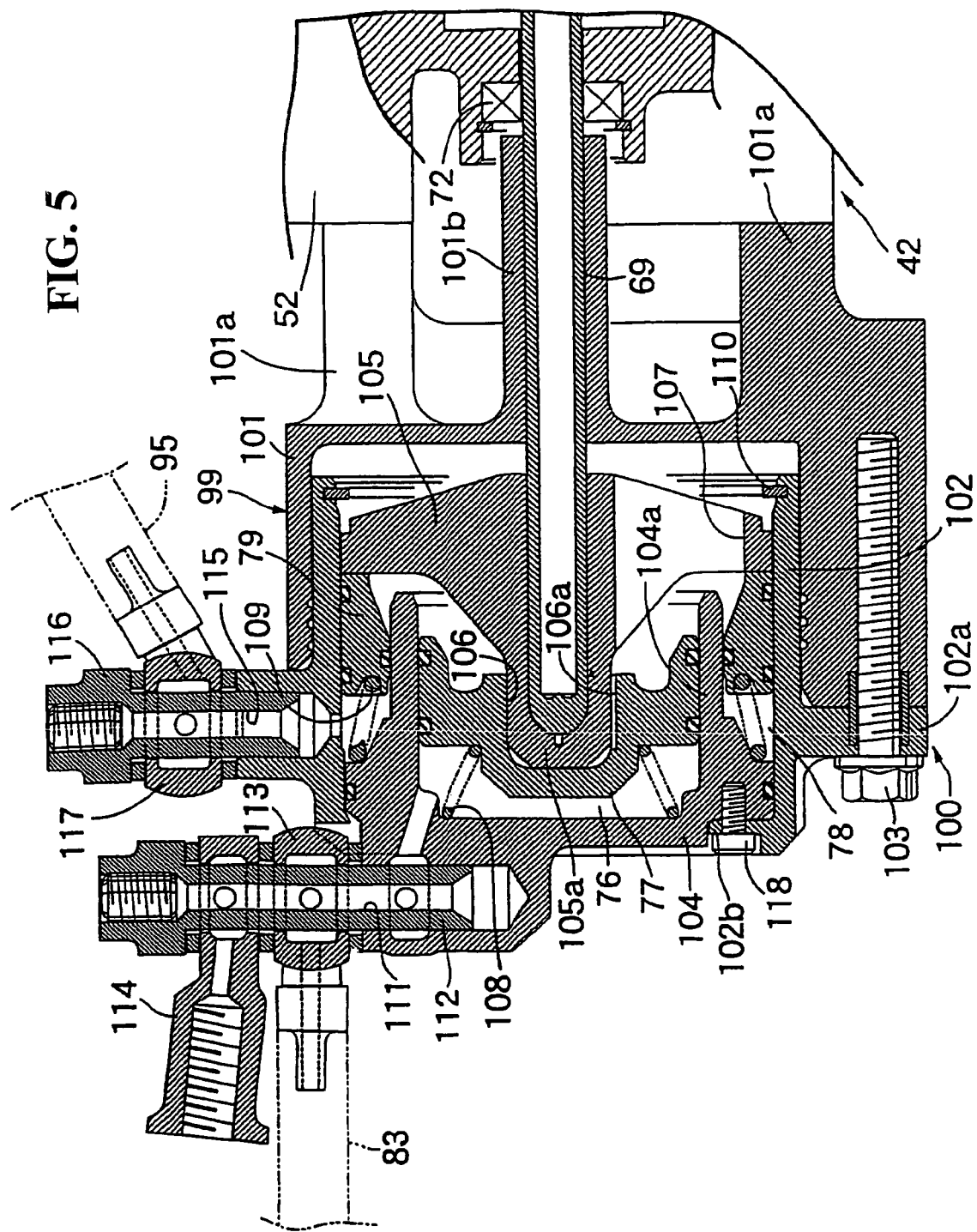
FIG. 5 is an enlarged cross-sectional view from arrow 5 of FIG. 2.

In FIG. 5, single clutch drive means 100 corresponding to the clutch 49 are arranged at the left side wall 52 of the crankcase 42. First and second pistons 77, 79 are housed in the housing 99 of the clutch drive means 100 in such a manner that the first piston 77 is concentrically surrounded by the second piston 79.

The housing 99 includes a support case 101 fitted to the left side wall 52 of the crankcase 42, a large cylinder body 102 and a small cylinder body 104. The support case 101 is formed in a cylindrical shape with a bottom so that the closed end faces the left side wall 52 of the crankcase 42. A plurality of arm sections 101a ... integrally come into contact with the outer surface of the left side wall 52 so as to be fastened. The support case 101 is arranged on the same axis as the main shaft 48 of the gear transmission 47 in a state of being fastened to the left side wall 52. A guide cylinder 101b, through which a transmission rod 69 projecting from the left side wall 52 is inserted, is provided integrally so as to project at a central part of the outer surface of the closed end of the support case 101. The transmission rod 69 projects to within the support case 101 from the guide cylinder 101b.

The cylindrical large cylinder body 102 is fitted within the support case 101. An outward facing brim 102a, that projects radially outwardly, is provided integrally at the outer periphery of the central part of the large cylinder body 102. The outward facing brim 102a comes into contact with the open end of the support case 101 and is fastened using a plurality of bolts 103 .... Further, an inward facing brim 102b projecting radially inwards is provided integrally at the end projecting from the front support case 101 of the large cylinder body 102.

The small cylinder body 104 with a bottom and with an outer side taken as a closed base end is inserted tightly within the large cylinder body 102. The outer periphery of the closed base end of the small cylinder body 104 comes into contact with the inward facing brim 102b of the large cylinder body 102 from the inside, and is fastened to the inward facing brim 102b by a plurality of bolts 118 .... At the small cylinder body 104, a cylinder section 104a of a smaller diameter than the large cylinder body 102 is provided integrally coaxially within the large cylinder body 102.

The first piston 77 is fitted in a slideable manner to the cylinder section 104a so as to form the first hydraulic pressure chamber 76 with the closed base end of the small cylinder body 104. Further, the second piston 79 is formed in a ring-shape and is inserted in a manner capable of sliding between the cylinder section 104a of the small cylinder body 104 and the large cylinder body 102, so as to form the annular second hydraulic pressure chamber 78 between the second piston 79 and the small cylinder body 104 between the large cylinder body 102 and the cylinder section 104a.

The outer periphery of a slide member 105 is fitted into the large cylinder body 102. A transmission rod 69 is fitted at a central part of the slide member 105 and comes into contact so that the slide member 105 and the transmission rod 69 operate integrally. A through-hole 107 passing through both surfaces is provided at the slide member 105 in such a manner that the inside of the large cylinder body 102 is not partitioned by the slide member 105. A stopper wheel 110 for preventing detachment of the slide member 105 is fitted at the inner periphery of the inside end of the large cylinder body 102.

A coupling recess 106 is provided at a central part of the first piston 77 on the opposite side to the first hydraulic pressure chamber 76. A coupling projection 105a provided at a central part of the slide member 105 is then inserted into the coupling recess 106 so that an end makes contact with the closed base end of the coupling recess 106. A groove 106a extending in an axial direction so as to pass between the closed base end of the coupling recess 106 and the coupling projection 105a is provided at the inner periphery of the coupling recess 106. A second piston 79 is capable of making contact at the outer periphery of the slide member 105. One of the first and second pistons 77, 79 is capable of pressing the slide member 105 at the time of this operation. Springs 108, 109 exhibiting a weak spring force that merely makes the first and second pistons 77, 79 make contact with the slide member 105 are housed in the first and second hydraulic pressure chambers 76, 78.

A connecting pipe 112 forming an oil path 111 passing through the first hydraulic pressure chamber 76 is fitted at the closed end of the small cylinder body 104 with an axis following the radial direction of the small cylinder body 104, with the outer end of the connecting pipe 112 being closed. The joint 113 connected to the first pipe 83 is fitted at the connecting pipe 112 so that the first pipe 83 passes through the oil path 111. The air extraction pipe 114 is fitted to the connecting pipe 112 so as to be in communication with the oil path 111. The air extraction pipe 114 is normally closed.

Further, a connecting pipe 116 forming an oil path 115 passing through the second hydraulic pressure chamber 78 is fitted at the large cylinder body 102 with an axis following the radial direction of the large cylinder body 102, with the outer end of the connecting pipe 116 being closed. The joint 117 connected to the second pipe 95 is fitted at the connecting pipe 116 so that the second pipe 95 passes through the oil path 115.

The hydraulic pressure generated by the first hydraulic pressure generating means 74 then acts on the first hydraulic pressure chamber 76 via the first pipe 83 and the first piston 77 presses the transmission rod 69 via the slide member 105 in response to the increase in hydraulic pressure of the first hydraulic pressure chamber 76. As a result, the clutch 49 is disconnected. During this time, when hydraulic pressure is not generated on the side of the second hydraulic pressure generating means 75, the second piston 79 remains static, and the slide member 105 comes away from the second piston 79 and slides. Further, the hydraulic pressure generated by the second hydraulic pressure generating means 75 then acts on the second hydraulic pressure chamber 78 via the second pipe 95 and the second piston 79 presses the transmission rod 69 via the slide member 105 in response to the increase in hydraulic pressure of the second hydraulic pressure chamber 78. As a result, the clutch 49 is disconnected. During this time, when hydraulic pressure is not generated on the side of the first hydraulic pressure generating means 74, the first piston 77 remains static, and the slide member 105 comes away from the first piston 77 and slides.

Figure 6:
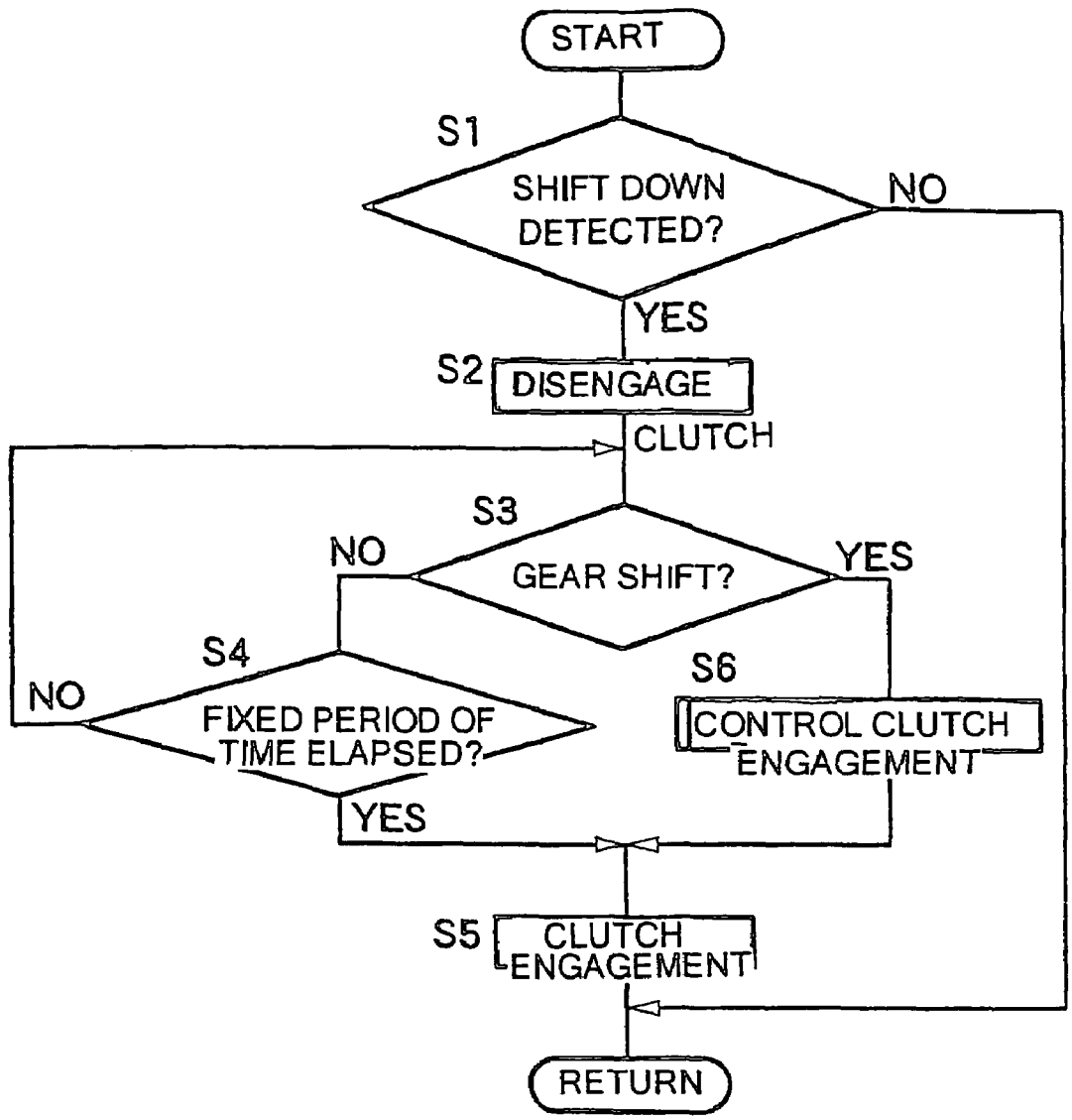
FIG. 6 is a flowchart showing a main routine for automatic clutch control.

The operation of the electric motor 85 of the second hydraulic pressure generating means 75 is for performing automatic control as shown in FIG. 6 according to the riding conditions of the motorcycle. In step S1, a determination is made as to whether or not a shift-down is detected. When a shift-down is detected, step S2 is proceeded to, the electric motor 85 is caused to operate, hydraulic pressure is outputted from the master cylinder 84 for automatic clutch control and the second piston 79 is caused to operate so as to disengage the clutch 49.

Next, in step S3, a determination is made as to whether a gear change has been made at the gear transmission 47. When a gear change has not been made, in step S4 it is determined whether or not a fixed time has elapsed. After a fixed time has elapsed, in step S5, the electric motor 85 is caused to operate in the reverse direction, hydraulic pressure of the cylinder 84 for automatic clutch control is released, and hydraulic pressure of the second hydraulic pressure chamber 78 is released so that the second piston 79 returns and the clutch 49 is engaged.

Figure 7:
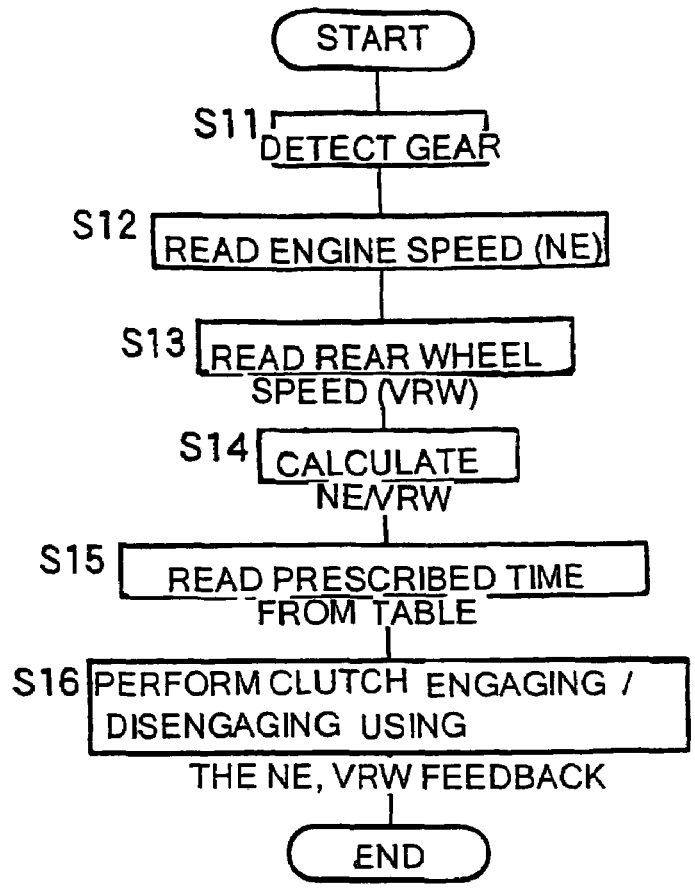
FIG. 7 is a flowchart showing a subroutine for clutch engagement control.

When a gear change is confirmed in step S3, step S6 is proceeded to and clutch engagement control processing is carried out and this clutch engagement control processing is executed in accordance with the flowchart shown in FIG. 7.

In FIG. 7, step S11, S12, S13 are executed in the order of detecting a shift in gears, reading engine speed NE, and reading vehicle speed VRW of the rear wheel. In step S13, it is also possible to read the speed of the counter shaft 21 rather than read the rear wheel speed VRW.

In step S14, (NE/VRW) or (NE/speed of counter shaft 21) is calculated. In step S15, a prescribed time set in advance for every gear shift before shifting down is read from a table. After this, in step S16, a clutch engagement control operation is carried out using feedback for the engine speed NE and the rear wheel speed VRW.

Figure 8:
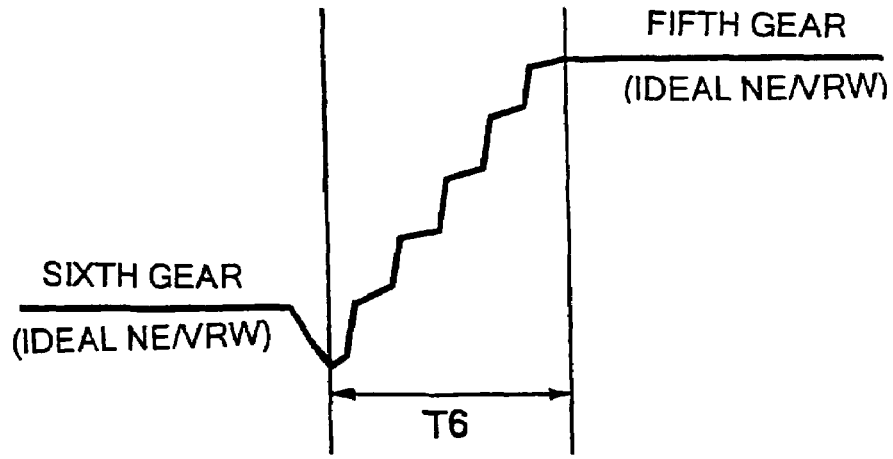
FIG. 8 is a view showing change (in engine speed/rear wheel speed) when shifting down from sixth gear to fifth gear.

In step S16, the clutch engagement control is such that after a prescribed period of time has elapsed, that is set according to a gear shift prior to a shift down, (NE/VRW) calculated in step S14 is controlled to approach the ideal (NE/VRW) after shut down. For example, at the time of a shift down from sixth gear to fifth gear, as shown in FIG. 8, fine control is exerted on the electric motor 85 in such a manner that the ideal (NE/VRW) for the fifth gear is approached after a prescribed time T6 set in advance to correspond to the sixth gear has elapsed. This enables engaging and disengaging of the clutch 49 to be repeated.

Next, describing the operation of the first embodiment, engagement and disengagement of the clutch 49 interposed between the crankshaft 43 of the engine and the main shaft 48 of the gear transmission 47 is switched over according to the generation of hydraulic pressure of the first hydraulic pressure generating means 74 generating hydraulic pressure in accordance with rider operations and is switched over independently from the first hydraulic pressure generating means 74 according to the generation of hydraulic pressure by the second hydraulic pressure generating means 75 generated automatically according to the drive conditions of the vehicle. However, the first piston 77 with one side facing the first hydraulic pressure chamber 76 linked to the first hydraulic pressure generating means 74 and the second piston 79 with one face facing the second hydraulic pressure chamber 78 are linked to the second hydraulic pressure generating means 75 independent from the first hydraulic pressure generating means 76 and interlock so as to be linked.

Namely, it is possible to switch over a state of connection and disconnection of the clutch 49 according to operation of the first piston 77 according to generation of hydraulic pressure by the first hydraulic pressure generating means 74, and it is possible to switch over between a state of connection and disconnection of the clutch 49 according to operation of the second piston 79 independent of the first piston 77 in response to generation of hydraulic pressure of the second hydraulic pressure generating means 75. It is therefore possible to prevent mutual interference between the clutch operation of a driver and automatic clutch control and simplification of control can be achieved. Further, it is possible to reduce the amount of oil changing for operation by changing just the necessary hydraulic pressure paths of the hydraulic pressure paths connected to the first and second hydraulic pressure generating means 74, 75.

Further, the first and second pistons 77, 79 are housed at the support case 99 with the single clutch drive means 100 being provided for driving the clutch 49. The clutch drive means 100 for driving the clutch 49 are arranged in common with the first and second hydraulic pressure generating means 74, 75 so as to reduce the number of parts. Therefore, it is possible to easily ensure space for locating the clutch drive means 100 even in vehicles with limited installation space.

However, the first and second pistons 77, 79 are housed within the housing 99 in such a manner that the first piston 77 concentrically surrounds the second piston 79. The clutch drive means 100 can therefore be prevented from being large in the axial direction compared to where the first and second pistons 77, 79 that are lined up in the axial direction.

The first hydraulic pressure generating means 74 is arranged on the side of the handlebars 73 of the saddle-type motorcycle and the second hydraulic pressure generating means 75 is arranged at the side of the main frame 13 of the vehicle frame F in the vicinity of the engine body 17. It is therefore possible to make the hydraulic pressure path from the second hydraulic pressure generating means 75 to the second piston 79 and the hydraulic pressure transmission time short. This enables the precision and responsiveness of clutch control by the second hydraulic pressure generating means 75 to be increased.

In the first embodiment described above, the second hydraulic pressure generating means 75 is provided at the vehicle frame F in the vicinity of the engine 17 but the second hydraulic pressure generating means 75 may also be provided at one of either the left or right side of the engine body 17, one of either the top or bottom of the engine body 17, or between the front bank BF and the rear bank BR of a V-type engine provided so that close proximity to the engine body 17 is maintained.

Figure 9:
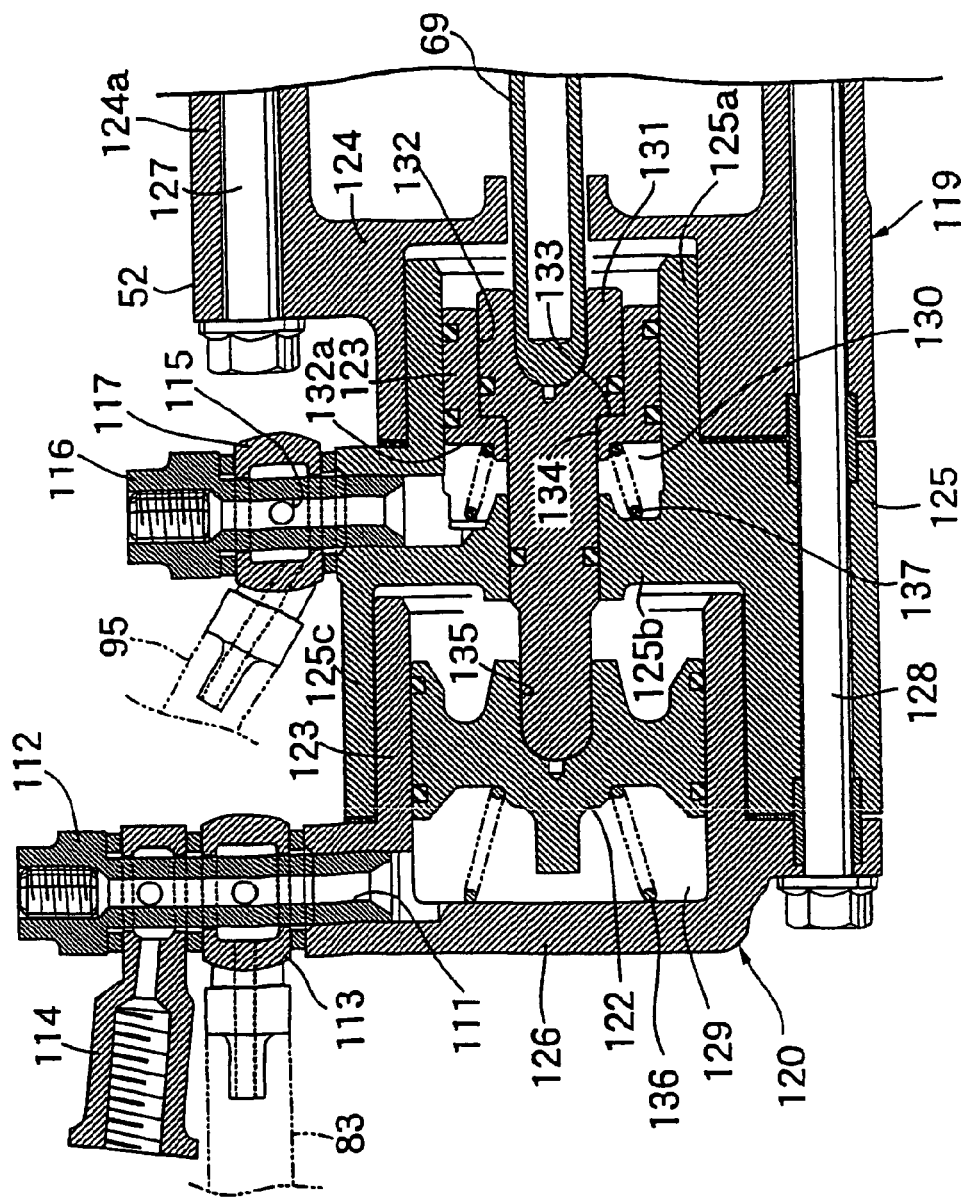
FIG. 9 is a longitudinal cross-sectional view of a clutch drive means of a second embodiment.

FIG. 9 shows a second embodiment of the present invention. Portions corresponding to FIG. 1 are given the same reference numerals and are not described in detail.

First and second pistons 122, 123 are housed lined up in an axial direction in the housing 119 of a single clutch drive means 120 corresponding to the clutch 49 (refer to the first embodiment).

The housing 119 includes a support case 124 fitted to the left side wall 52 (refer to first embodiment) of the crankcase 42, a first cylinder body 125 and a second cylinder body 126. The support case 124 is cylindrical with a bottom and is formed with the closed end facing the left side wall 52 (refer to first embodiment) of the crankcase 42. A plurality of arm sections 124a . . . projecting from the outer surface of the closed end of the support case 124 are fastened to the left side wall 52 using bolts 127. . . .

The first cylinder body 125 is integrally formed with a cylinder 125a fitted at the support case 124, an end wall 125b on the opposite side to the support case 124, with an end of the cylinder 125a closed, and a cylindrical case 125c, formed with a larger diameter than the cylinder 125a, extending from the outer periphery of the end wall 125b on the opposite side to the cylinder 125a. The second cylinder body 126 is formed in the shape of a cylinder with a bottom with the closed end facing to the outside, and fits into the case 125c of the first cylinder body 125. The support case 124, first cylinder body 125 and second cylinder body 126 are fastened using a plurality of bolts 128 . . . .

A first piston 122 is fitted in a slideable manner to the second cylinder body 126 so as to form the first hydraulic pressure chamber 129 with the closed base end of the second cylinder body 126. Further, a second piston 123 is fitted in a slideable manner at the end wall 125b of the first cylinder body 125 so as to form the second hydraulic pressure chamber 130 with the wall end 125b of the first cylinder body 125.

The transmission rod 69 inserted within the support case 124 is fitted at one end of a pressing rod 131 so as to come into contact, with the pressing rod 131 and the transmission rod 69 operating integrally. At the central part of the second piston 123, a large insertion hole 132 is formed coaxial with the pressing rod 69. A small insertion hole 134 is formed coaxially within the large insertion hole 132 within an annular stepped section 133 facing the side of the support case 124. The pressing rod 131 is then inserted through in a slidable manner so as to have a stepped section coming into contact with the stepped section 133 at an outer periphery at the large insertion hole 132 and the small insertion hole 134. Further, the pressing rod 131 fits tightly with a central part of the end wall 125b at the first cylinder 125 and freely passes through in an axial direction. The other end of the pressing rod 131 fits with and comes into contact with the first piston 122. Namely, a connecting recess 135 is provided at a central part of the first piston 122 on the opposite side to the first hydraulic pressure chamber 129 and the other end of the pressing rod 131 is inserted into the connecting recess 135 so that the end comes into contact with the closed end of the connecting recess 135.

It is possible for either of the first and second pistons 122, 123 to press against the transmission rod 69 via the pressing rod 131 at the time of this operation and springs 136, 137 exhibiting only a weak spring force so as to enable the first and second pistons 122, 123 to come into contact with the pressing rod 131 are housed in the first and second hydraulic pressure chambers 129, 130.

At the closed end of the second cylinder 126, the first pipe 83 is connected so as to pass through the first hydraulic pressure chamber 129 using the same structure as for the first embodiment, and at the first cylinder body 125, the second pipe 95 is connected so as to pass through the second hydraulic pressure chamber 130 using the same structure as for the first embodiment.

According to the second embodiment, the first and second pistons 122, 123 are housed so as to be lined up along the axial direction at the housing 119 of the clutch drive means 120. It is therefore possible to make the external diameter of the clutch drive means 120 small compared with the first embodiment where the first and second pistons 77, 79 are arranged coaxially, and it is possible to reduce the amount of oil required for operation.

By adopting the mechanism of the first and second embodiments described above, when control is performed in such a manner that the second hydraulic pressure generating means 75 is made to operate according to an engaging and disengaging operation of the clutch by the rider, it is possible to perform clutch assist control in such a manner that the rider clutch operation load is reduced.

Figure 10:
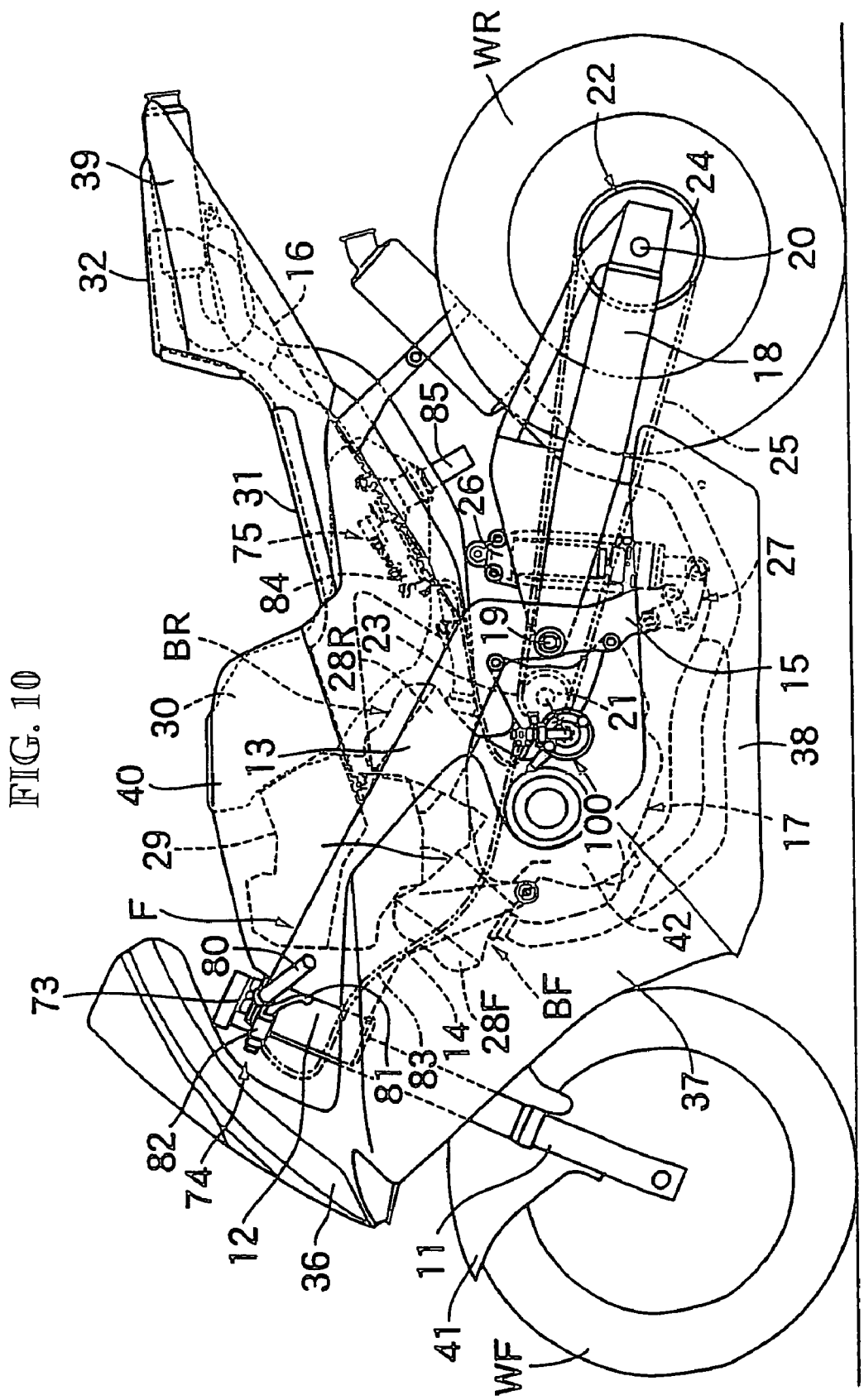
FIG. 10 is a side view of a motorcycle of a third embodiment corresponding to FIG. 1.

In a third embodiment of the present invention, as shown in FIG. 10, it is also possible to fit the rear frame 16 to the vehicle frame F in such a manner as to be away from the engine body 17. In doing this, it is possible to avoid the influence of heat dissipated from the engine body 17 which is exaggerated by the second hydraulic pressure generating means 75.

An embodiment of the present invention has been described in detail above, but the present invention is not thus limited and various design changes are possible without departing from the scope of the appended claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch control assembly for a vehicle equipped with a vehicle clutch control device comprising:
a clutch for switching over a connected and disengaged state between an engine and a driven member;
a first hydraulic pressure generating means for generating hydraulic pressure for switching between a connected and disengaged state of the clutch according to an operation of a vehicle driver;
second hydraulic pressure generating means, independent from the first hydraulic pressure generating means, for automatically generating hydraulic pressure for switching between a connected and disengaged state of the clutch according to drive conditions of the vehicle, with a first piston having one side facing a first hydraulic pressure chamber linked to the first hydraulic pressure generating means, and
a second piston, independent from the first hydraulic pressure chamber, having one side facing a second hydraulic pressure chamber linked to the second pressure generating means, the first and second pistons interlocking with each other and being connected to the clutch;
a slide member having a hole extending in an axial direction thereof; and
a transmission rod adapted to fit into an entire length of the hole of the slide member,
wherein the slide member is operatively connected to the first and second pistons for selectively being imparted with slidable movement for actuating said clutch via the transmission rod.

2. The clutch control assembly for a vehicle as disclosed in claim 1, wherein the first and second pistons are housed in housings provided with single clutch drive means for driving the clutch.

3. The vehicle clutch control assembly as disclosed in claim 2, wherein the first and second pistons are accommodated in the housing in such a manner that one piston surrounds the other piston.

4. The clutch control assembly for a vehicle as disclosed in claim 3, wherein the first hydraulic pressure generating means is arranged at the side of handlebars of a saddle-ridden type vehicle, and second hydraulic pressure generating means is arranged at the side of the vehicle frame in the vicinity of the engine body.

5. The clutch control assembly for a vehicle as disclosed in claim 2, wherein the first and second pistons are accommodated in the housing in parallel along an axial direction.

6. The clutch control assembly for a vehicle as disclosed in claim 5, wherein the first hydraulic pressure generating means is arranged at the side of handlebars of a saddle-ridden type vehicle, and second hydraulic pressure generating means is arranged at the side of the vehicle frame in the vicinity of the engine body.

7. The clutch control assembly for a vehicle as disclosed in claim 2, wherein the first hydraulic pressure generating means is arranged at the side of handlebars of a saddle-ridden type vehicle, and second hydraulic pressure generating means is arranged at the side of the vehicle frame in the vicinity of the engine body.

8. The clutch control assembly for a vehicle as disclosed in claim 1, wherein the first hydraulic pressure generating means is arranged at the side of handlebars of a saddle-ridden type vehicle, and second hydraulic pressure generating means is arranged at the side of the vehicle frame in the vicinity of the engine body.

9. The clutch control assembly for a vehicle as disclosed in claim 1, wherein said second pressure generating means further includes a motor having an output shaft operatively connected to a rod projecting from a master cylinder for imparting movement thereto for actuating said master cylinder to supply pressurized fluid for actuating said second hydraulic pressure chamber.

10. A clutch control assembly for a vehicle equipped with a vehicle clutch control device comprising:
a clutch for switching over a connected and disengaged state between an engine and a driven member;
a first hydraulic pressure generating means for generating hydraulic pressure for switching between a connected and disengaged state of the clutch according to an operation of a vehicle driver;

second hydraulic pressure generating means, independent from the first hydraulic pressure generating means, for automatically generating hydraulic pressure for switching between a connected and disengaged state of the clutch according to drive conditions of the vehicle, with
a first piston having one side facing a first hydraulic pressure chamber linked to the first hydraulic pressure generating means, and
a second piston, independent from the first hydraulic pressure chamber, having one side facing a second hydraulic pressure chamber linked to the second pressure generating means, the first and second pistons interlocking with each other and being connected to the clutch, and
a slide member operatively connected to the first and second pistons for selectively being imparted with slidable movement for actuating said clutch,
wherein the slide member is adapted to fit into a large cylinder body surrounding the second piston, the slide member including a coupling projection adapted to fit within a coupling recess of the first piston, so that the first piston is able to press directly on an end surface of the coupling projection for actuating said clutch.

11. A clutch control assembly adapted for use with a vehicle equipped with a vehicle clutch control device having a clutch for switching over a connected and disengaged state between an engine and a driven member comprising:
a first hydraulic pressure generating means adapted for generating hydraulic pressure for selectively switching between a connected and disengaged state of the clutch according to an operation of a vehicle driver; and
second hydraulic pressure generating means, independent from the first hydraulic pressure generating means, and adapted for automatically generating hydraulic pressure for switching between a connected and disengaged state of the clutch according to drive conditions of the vehicle;
a first piston having one side facing a first hydraulic pressure chamber linked to the first hydraulic pressure generating means;
a second piston, independent from the first hydraulic pressure chamber, having one side facing a second hydraulic pressure chamber linked to the second pressure generating means, the first and second pistons interlocking with each other and being connected to the clutch;
a slide member having a hole extending in an axial direction thereof; and
a transmission rod adapted to fit into an entire length of the hole of the slide member,
wherein the slide member is operatively connected to the first and second pistons for selectively being imparted with slidable movement for actuating said clutch via the transmission rod.

12. The clutch control assembly adapted for use with a vehicle as disclosed in claim 11, wherein the first and second pistons are housed in housings provided with single clutch drive means for driving the clutch.

13. The vehicle clutch control assembly adapted for use with a vehicle as disclosed in claim 12, wherein the first and second pistons are accommodated in the housing in such a manner that one piston surrounds the other piston.

14. The clutch control assembly adapted for use with a vehicle as disclosed in claim 13, wherein the first hydraulic pressure generating means is arranged at the side of handlebars of a saddle-ridden type vehicle, and second hydraulic pressure generating means is arranged at the side of the vehicle frame in the vicinity of the engine body.

15. The clutch control assembly adapted for use with a vehicle as disclosed in claim 12, wherein the first and second pistons are accommodated in the housing in parallel along an axial direction.

16. The clutch control assembly adapted for use with a vehicle as disclosed in claim 15, wherein the first hydraulic pressure generating means is arranged at the side of handlebars of a saddle-ridden type vehicle, and second hydraulic pressure generating means is arranged at the side of the vehicle frame in the vicinity of the engine body.

17. The clutch control assembly adapted for use with a vehicle as disclosed in claim 12, wherein the first hydraulic pressure generating means is arranged at the side of handlebars of a saddle-ridden type vehicle, and second hydraulic pressure generating means is arranged at the side of the vehicle frame in the vicinity of the engine body.

18. The clutch control assembly adapted for use with a vehicle as disclosed in claim 11, wherein the first hydraulic pressure generating means is arranged at the side of handlebars of a saddle-ridden type vehicle, and second hydraulic pressure generating means is arranged at the side of the vehicle frame in the vicinity of the engine body.

19. The clutch control assembly adapted for use with a vehicle as disclosed in claim 11, wherein the slide member is adapted to fit into a large cylinder body surrounding the second piston, the slide member having a coupling projection adapted to fit within an entire length of coupling recess of the first piston.

20. The clutch control assembly adapted for use with a vehicle as disclosed in claim 11, wherein said second pressure generating means further includes a motor having an output shaft operatively connected to a rod projecting from a master cylinder for imparting movement thereto for actuating said master cylinder to supply pressurized fluid for actuating said second hydraulic pressure chamber.

* * * * *